(12) United States Patent
Qiang et al.

(10) Patent No.: US 11,190,245 B2
(45) Date of Patent: Nov. 30, 2021

(54) PORT TO ANTENNA MAPPING DESIGN IN VIRTUALIZED ACTIVE ANTENNA SYSTEM (AAS)

(71) Applicant: Telefonaktiebolaget LM Ericsson (publ), Stockholm (SE)

(72) Inventors: Yongquan Qiang, Ottawa (CA); Jianguo Long, Kanata (CA); Hong Ren, Kanata (CA); Shiguang Guo, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/273,810

(22) PCT Filed: Sep. 7, 2018

(86) PCT No.: PCT/IB2018/056855
§ 371 (c)(1),
(2) Date: Mar. 5, 2021

(87) PCT Pub. No.: WO2020/049349
PCT Pub. Date: Mar. 12, 2020

(65) Prior Publication Data
US 2021/0211166 A1 Jul. 8, 2021

(51) Int. Cl.
*H04B 7/04* (2017.01)
*H04B 7/0456* (2017.01)
(52) U.S. Cl.
CPC .................. *H04B 7/0456* (2013.01)

(58) Field of Classification Search
CPC .................................................. H04B 7/0456
See application file for complete search history.

(56) References Cited

U.S. PATENT DOCUMENTS

| 2015/0124688 A1 | 5/2015 | Xu et al. |
| 2017/0041113 A1 | 2/2017 | Park et al. |
| 2019/0089428 A1* | 3/2019 | Bethanabhotla ..... H04B 7/0617 |

FOREIGN PATENT DOCUMENTS

| WO | 2014052806 A1 | 4/2014 |
| WO | 2016077584 A1 | 5/2016 |

OTHER PUBLICATIONS

International Search Report and Written Opinion dated May 29, 2019 for International Application No. PCT/IB2018/056855 filed on Sep. 7, 2018, consisting of 11-pages.

* cited by examiner

*Primary Examiner* — Curtis B Odom
(74) *Attorney, Agent, or Firm* — Christopher & Weisberg, P.A.

(57) ABSTRACT

Apparatuses and methods for port-to-antenna mapping in a virtualized Active Antenna System (AAS) are provided. In one embodiment, a method for a radio node includes determining a source codebook associated with at least one antenna port; determining a target codebook associated with at least one physical antenna; and determining a port-to-antenna mapping matrix based at least in part on the determined source codebook and the determined target codebook.

27 Claims, 12 Drawing Sheets

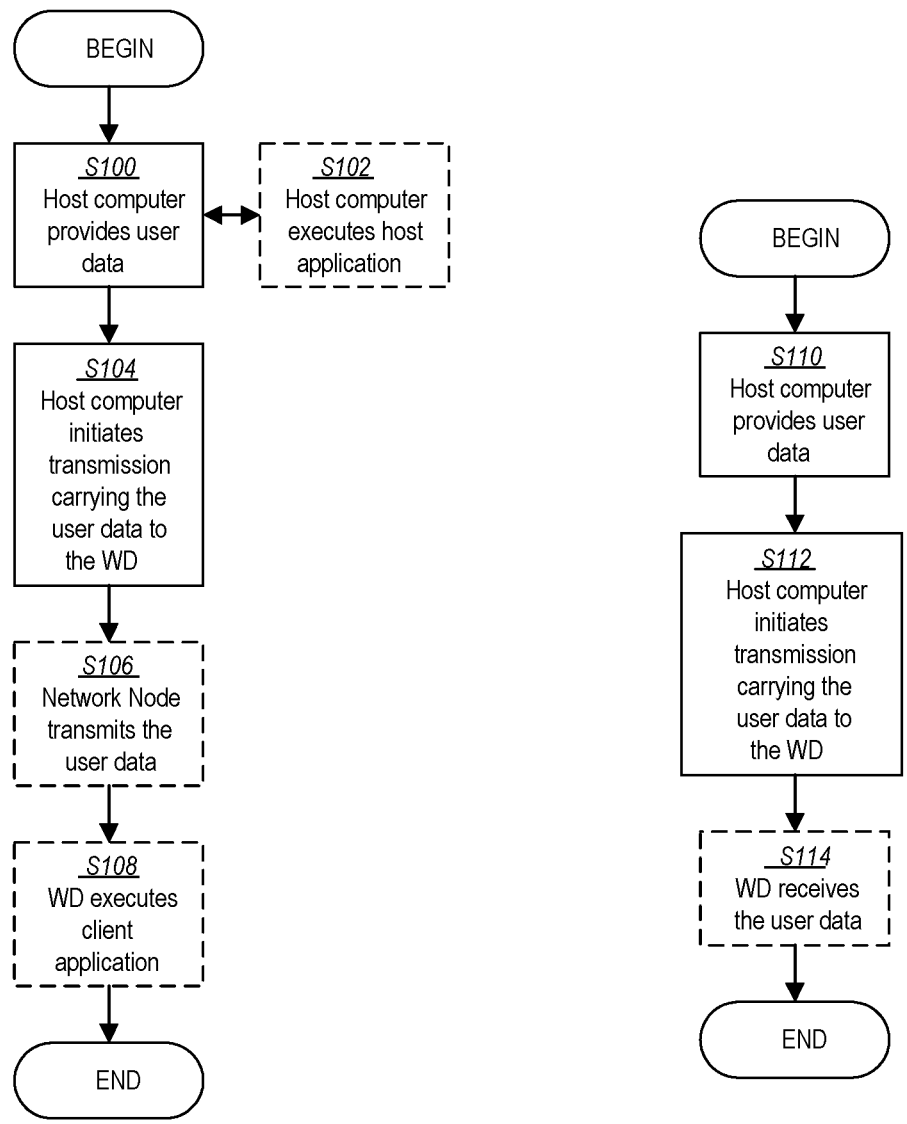

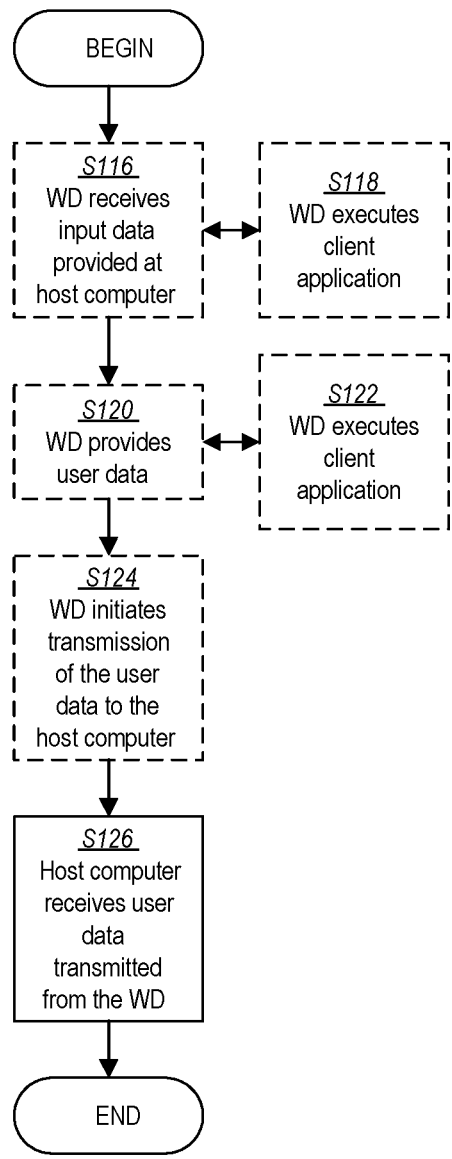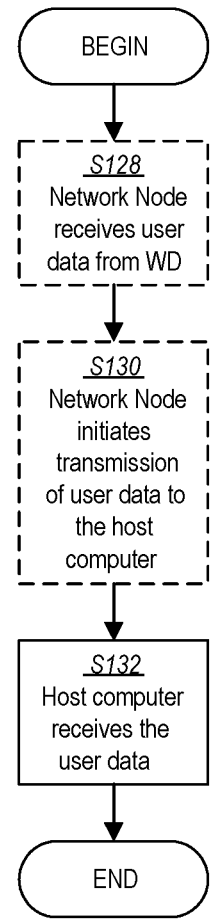
FIG. 9
FIG. 10

PORT TO ANTENNA MAPPING DESIGN IN VIRTUALIZED ACTIVE ANTENNA SYSTEM (AAS)

CROSS-REFERENCE TO RELATED APPLICATION

This application is a Submission Under 35 U.S.C. § 371 for U.S. National Stage Patent Application of International Application Number: PCT/IB2018/056855, filed Sep. 7, 2018 entitled "PORT TO ANTENNA MAPPING DESIGN IN VIRTUALIZED ACTIVE ANTENNA SYSTEM (AAS)," the entirety of which is incorporated herein by reference.

TECHNICAL FIELD

Wireless communication and in particular, port-to-antenna mapping design in a virtualized active antenna system (AAS).

BACKGROUND

The active antenna system (AAS) is one of the technologies adopted by 4G Long Term Evolution (LTE) and 5G New Radio (NR) to enhance the wireless network performance and capacity by using Full Dimension Multiple-In Multiple-Out (MIMO) (FD-MIMO), or massive MIMO. A typical AAS system includes a two-dimensional antenna (2D) elements array with M rows, N columns and two polarizations (cross-polarization) as shown, for example, in FIG. 1.

The AAS can be used for virtual sectorization to form a set of virtual sectors with a set of logical antenna ports by a port-to-antenna mapping matrix ($W_{p2a}$) as shown, for example, in FIG. 2. Thus, the AAS with $N_t$ ($N_t=2 \times N \times M$) antenna elements may be transformed to a virtualized AAS with $N_p$ ($N_p=2 \times N_1 \times N_2$) logical antenna ports. Typically, $N_p \leq N_t$.

One logical antenna port can be composited by a set of antenna elements (e.g., one vertical column, one horizontal row, or combinations of both vertical and horizontal antenna elements, or cross polarizations), which may be represented by each column of $W_{p2a}$. The antenna ports can be logical antenna ports observed, for example, by a wireless device (WD) with a beamformed Channel State Information Reference Signal (CSI-RS).

In a virtualized AAS, the precoding is generally performed (before the port-to-antenna mapping) with a precoding matrix $W_{PMI}$ in the logical antenna port space. Subsequently, the pre-coded signal can be mapped into physical antenna elements by a port-to-antenna mapping matrix $W_{p2a}$ as shown, for example, in FIG. 3. The AAS virtualization can be performed in the baseband unit (BBU), e.g. eNB or gNB, or the remote radio head (RRH).

Thus, the downlink (DL) precoding in a virtualized AAS can be modeled by, for example, $$y = H_{DL} W_{p2a} W_{PMI} x + n,$$

Where, x is transmitted data with with dimensions of v×1, $W_{PMI}$ is the precoding matrix in the logical antenna port domain with dimensions of $N_p \times v$, where v is the number of layers, derived from the WD's Channel Sate Information (CSI) report based on the beamformed CSI-RS ports and the predefined codebook. The port-to-antenna mapping matrix $W_{p2a}$ is a $N_t \times N_p$ matrix used to transform $N_t$ antenna elements to $N_p$ logical antenna ports. $H_{DL}$ represents the DL channel matrix for an un-virtualized AAS with dimensions of $N_r \times N_t$, where $N_r$ is the number of receiving antennas in the receiving radio node, such as, the WD.

In Rel-13, "CLASS A", or NR "Type-1" codebook, a two-dimensional discrete Fourier transform (DFT) matrix is adopted. The precoding matrix $W_{PMI}$ may be a two-stage precoding structure as follows, $$W_{PMI} = W_1 W_2,$$

where $W_1$ includes a group of 2D grid-of-beams (GoB) denoted by $$W_1 = \begin{bmatrix} x_h \otimes x_v & 0 \\ 0 & x_h \otimes x_v \end{bmatrix},$$

where, $x_h(x_h \in X_h)$ and $x_v$ ($x_v \in X_v$) are a group of GoB vectors for the horizontal and the vertical direction, respectively. The codebooks $X_h$ and $X_v$ are each an over-sampled DFT matrix for the horizontal and the vertical direction, respectively and are pre-defined or predetermined according to the configured number of two-dimensional CSI-RS ports ($N_1$, $N_2$) and the over-sampling rate ($O_1$, $O_2$), expressed by $$x_h = \frac{1}{\sqrt{N_1}} \left[ 1, e^{\frac{j2\pi h}{N_1 O_1}}, \ldots, e^{\frac{j2\pi n h}{N_1 O_1}}, \ldots, e^{\frac{j2\pi(N_1-1)h}{N_1 O_1}} \right]^T$$

$$x_v = \frac{1}{\sqrt{N_2}} \left[ 1, e^{\frac{j2\pi v}{N_2 O_2}}, \ldots, e^{\frac{j2\pi n v}{N_2 O_2}}, \ldots, e^{\frac{j2\pi(N_2-1)v}{N_2 O_2}} \right]^T.$$

The beam selection and co-phasing matrix $W_2$ can be defined according to the number of layers as follows:

For single layer transmission:

$$W_2 = \frac{1}{\sqrt{2}} \begin{bmatrix} 1 \\ \varphi_l \end{bmatrix}$$

For dual layer transmission:

$$W_2 = \frac{1}{2} \begin{bmatrix} 1 & 1 \\ \varphi_l & -\varphi_l \end{bmatrix},$$

where $\varphi_l$ is the co-phasing factor determined by the WD reported wideband or subband co-phasing index l, denoted by $$\varphi_l = e^{j\pi l/2}.$$

Thus, the total number of configured antenna ports is $N_p = 2 \times N_1 \times N_2$.

In the Rel-15 NR specification, up to 32 CSI-RS ports may be supported per CSI-RS resource. On the other hand, the number of CSI-RS ports supported by the WD may be very limited due to cost and complexity. For instance, the WD may only support up to 4 or 8 CSI-RS ports in the first NR release. Usually, in a conventional AAS system, the network radio node (e.g., eNB/gNB) has a large number of antenna elements (e.g., $N_t=64$). Particularly in such cases, CSI-RS port virtualization (port-to-antenna mapping) may be required.

SUMMARY

Some embodiments advantageously provide methods and apparatuses for a port-to-antenna mapping that can be optimized according to the antenna layout and/or the codebook pre-defined/predetermined for the virtual antenna ports and/or for a desired radiation pattern and coverage. Some embodiments of the present disclosure may improve coverage in virtualized AAS over existing port-to-antenna mapping techniques.

According to one aspect of the present disclosure, a radio node comprising processing circuitry is provided. The processing circuitry is configured to determine a source codebook associated with at least one antenna port; determine a target codebook associated with at least one physical antenna; and determine a port-to-antenna mapping matrix based at least in part on the determined source codebook and the determined target codebook.

In some embodiments of this aspect, the processing circuitry is configured to determine the port-to-antenna mapping matrix by being further configured to generate a weight matrix based at least in part on the source codebook and the target codebook. In some embodiments of this aspect, the processing circuitry is configured to determine the port-to-antenna mapping matrix by being further configured to determine the port-to-antenna mapping matrix based at least in part on the generated weight matrix. In some embodiments of this aspect, the processing circuitry is configured to generate the weight matrix by being further configured to determine, for each one of a plurality of precoding vector pairs, a weight of the weight matrix, each one of the plurality of precoding vector pairs comprising one precoding vector from the source codebook and one corresponding precoding vector from the target codebook. In some embodiments of this aspect, the processing circuitry is configured to generate the weight matrix by being further configured to determine, for each one of a plurality of precoding vector pairs, one of a differentiated weight of sum square and an equal weight of sum square, each one of the plurality of precoding vector pairs comprising one precoding vector from the source codebook and one corresponding precoding vector from the target codebook. In some embodiments of this aspect, the processing circuitry is configured to determine the port-to-antenna mapping matrix by being further configured to determine the port-to-antenna mapping matrix based at least in part on the determined weights for the weight matrix. In some embodiments of this aspect, the processing circuitry is configured to determine the port-to-antenna mapping matrix by being further configured to determine the port-to-antenna mapping matrix according to a function of at least the source codebook and the target codebook. In some embodiments of this aspect, the processing circuitry is configured to determine the port-to-antenna mapping matrix by being further configured to determine the port-to-antenna mapping matrix according to a weighted least square resolution, the weighted least square resolution using at least the source codebook, the target codebook, and the weight matrix. In some embodiments of this aspect, the processing circuitry is configured to determine the port-to-antenna mapping matrix by being further configured to determine the port-to-antenna mapping matrix according to a linear equation resolution, the linear equation resolution using at least the source codebook and the target codebook. In some embodiments of this aspect, the source codebook is selected from a predetermined codebook, the predetermined codebook being based on at least one channel state information reference signal, CSI-RS, port configuration. In some embodiments of this aspect, the target codebook is different from the source codebook. In some embodiments of this aspect, the target codebook is selected from a predetermined codebook based at least in part on at least one radiation pattern corresponding to at least one target coverage area. In some embodiments of this aspect, the processing circuitry is further configured to map the at least one antenna port to the at least one physical antenna according to the determined port-to-antenna mapping matrix. In some embodiments of this aspect, the processing circuitry is further configured to cause the radio node to transmit data associated with the at least one antenna port via the at least one physical antenna according to the determined port-to-antenna mapping matrix. In some embodiments of this aspect, the radio node is one of a network node and a wireless device. In some embodiments of this aspect, the at least one physical antenna comprises at least one of at least one physical antenna element and at least one subarray forming at least a one-dimensional antenna array. In some embodiments of this aspect, the processing circuitry is configured to determine the source codebook associated with the at least one antenna port by being configured to select a plurality of precoding vectors in a codebook defined for the at least one antenna port. In some embodiments of this aspect, the processing circuitry is configured to determine the target codebook associated with the at least one physical antenna by being configured to, for each of the plurality of precoding vectors selected for the source codebook, determine a corresponding precoding vector for the target codebook based at least in part on at least one target radiation pattern corresponding to at least one target coverage area. In some embodiments of this aspect, a number of the selected plurality of precoding vectors at least meets a number of the at least one antenna ports. In some embodiments, the processing circuitry is configured to determine the target codebook associated with the at least one physical antenna by being configured to select a plurality of precoding vectors from a plurality of Discrete Fourier Transform, DFT, vectors. In some embodiments of this aspect, the processing circuitry is configured to determine the target codebook associated with the at least one physical antenna by being configured to select a plurality of precoding vectors from a plurality of over-sampled Discrete Fourier Transform, DFT, vectors. In some embodiments of this aspect, the processing circuitry is configured to determine the target codebook associated with the at least one physical antenna by being configured to select a plurality of precoding vectors from one of a plurality of tapered Discrete Fourier Transform, DFT, vectors and a plurality of shifted DFT vectors. In some embodiments of this aspect, the processing circuitry is configured to determine the port-to-antenna mapping matrix by being configured to determine a three-dimensional port-to-antenna mapping as a Kronecker product of three one-dimensional port-to-antenna mapping matrices, each of the three one-dimensional port-to-antenna mapping matrices based at least in part on a respective source codebook and a corresponding target codebook. In some embodiments, the processing circuitry is configured to determine the port-to-antenna mapping matrix by being configured to determine at least a two-dimensional port-to-antenna mapping matrix as a Kronecker product of at least two one-dimensional port-to-antenna mapping matrices, a first one of the one-dimensional port-to-antenna mapping matrices for a horizontal direction and a second one of the one-dimensional port-to-antenna mapping matrices for a vertical direction, each of the at least two one-dimensional port-to-antenna mapping matrices based at least in part on a respective source codebook and a corresponding target codebook in a corresponding direction.

According to another aspect, a method for a radio node is provided. The method includes determining a source codebook associated with at least one antenna port; determining a target codebook associated with at least one physical antenna; and determining a port-to-antenna mapping matrix based at least in part on the determined source codebook and the determined target codebook. In some embodiments of this aspect, determining the port-to-antenna mapping matrix comprises generating a weight matrix based at least in part on the source codebook and the target codebook. In some embodiments of this aspect, determining the port-to-antenna mapping matrix comprises determining the port-to-antenna mapping matrix based at least in part on the generated weight matrix. In some embodiments of this aspect, generating the weight matrix comprises determining, for each one of a plurality of precoding vector pairs, a weight of the weight matrix, each one of the plurality of precoding vector pairs comprising one precoding vector from the source codebook and one corresponding precoding vector from the target codebook. In some embodiments of this aspect, generating the weight matrix comprises determining, for each one of a plurality of precoding vector pairs, one of a differentiated weight of sum square and an equal weight of sum square, each one of the plurality of precoding vector pairs comprising one precoding vector from the source codebook and one corresponding precoding vector from the target codebook. In some embodiments of this aspect, determining the port-to-antenna mapping matrix comprises determining the port-to-antenna mapping matrix based at least in part on the determined weights for the weight matrix. In some embodiments of this aspect, determining the port-to-antenna mapping matrix comprises determining the port-to-antenna mapping matrix according to a function of at least the source codebook and the target codebook. In some embodiments of this aspect, determining the port-to-antenna mapping matrix comprises determining the port-to-antenna mapping matrix according to a weighted least square resolution, the weighted least square resolution using at least the source codebook, the target codebook, and the weight matrix. In some embodiments of this aspect, determining the port-to-antenna mapping matrix comprises determining the port-to-antenna mapping matrix according to a linear equation resolution, the linear equation resolution using at least the source codebook and the target codebook. In some embodiments of this aspect, the source codebook is selected from a predetermined codebook, the predetermined codebook being based on at least one channel state information reference signal, CSI-RS, port configuration. In some embodiments of this aspect, the target codebook is different from the source codebook. In some embodiments of this aspect, the target codebook is selected from a predetermined codebook based at least in part on at least one radiation pattern corresponding to at least one target coverage area. In some embodiments of this aspect, the method further includes mapping the at least one antenna port to the at least one physical antenna according to the determined port-to-antenna mapping matrix. In some embodiments of this aspect, the method further includes causing the radio node to transmit data associated with the at least one antenna port via the at least one physical antenna according to the determined port-to-antenna mapping matrix. In some embodiments of this aspect, the radio node is one of a network node and a wireless device. In some embodiments of this aspect, the at least one physical antenna comprises at least one of at least one physical antenna element and at least one subarray forming at least a one-dimensional antenna array. In some embodiments of this aspect, determining the source codebook associated with the at least one antenna port comprises selecting a plurality of precoding vectors in a codebook defined for the at least one antenna port. In some embodiments of this aspect, determining the target codebook associated with the at least one physical antenna comprises, for each of the plurality of precoding vectors selected for the source codebook, determining a corresponding precoding vector for the target codebook based at least in part on at least one target radiation pattern corresponding to at least one target coverage area. In some embodiments of this aspect, a number of the selected plurality of precoding vectors at least meets a number of the at least one antenna ports. In some embodiments of this aspect, the determining the target codebook associated with the at least one physical antenna comprises selecting a plurality of precoding vectors from a plurality of Discrete Fourier Transform, DFT, vectors. In some embodiments of this aspect, the determining the target codebook associated with the at least one physical antenna comprises selecting a plurality of precoding vectors from a plurality of over-sampled Discrete Fourier Transform, DFT, vectors. In some embodiments of this aspect, the determining the target codebook associated with the at least one physical antenna comprises selecting a plurality of precoding vectors from one of a plurality of tapered Discrete Fourier Transform, DFT, vectors and a plurality of shifted DFT vectors. In some embodiments of this aspect, determining the port-to-antenna mapping matrix comprises determining a three-dimensional port-to-antenna mapping as a Kronecker product of three one-dimensional port-to-antenna mapping matrices, each of the three one-dimensional port-to-antenna mapping matrices based at least in part on a respective source codebook and a corresponding target codebook. In some embodiments of this aspect, determining the port-to-antenna mapping matrix comprises determining at least a two-dimensional port-to-antenna mapping matrix as a Kronecker product of at least two one-dimensional port-to-antenna mapping matrices, a first one of the one-dimensional port-to-antenna mapping matrices for a horizontal direction and a second one of the one-dimensional port-to-antenna mapping matrices for a vertical direction, each of the at least two one-dimensional port-to-antenna mapping matrices based at least in part on a respective source codebook and a corresponding target codebook in a corresponding direction.

According to another aspect, a receiving radio node comprising processing circuitry is provided. The processing circuitry is configured to cause the receiving radio node to receive a signal from a transmitting radio node, the signal being based at least in part on a port-to-antenna mapping matrix, the port-to-antenna mapping matrix based at least in part on a source codebook and a target codebook, the source codebook associated with at least one antenna port and the target codebook associated with at least one physical antenna. In some embodiments of this aspect, the port-to-antenna mapping matrix is further based on a weight matrix, the weight matrix comprising, for each of one of a plurality of precoding vector pairs, one of a differentiated weight of sum square and an equal weight of sum square, each one of the plurality of precoding vector pairs comprising one precoding vector from the source codebook and one corresponding precoding vector from the target codebook. In some embodiments, the target codebook is based on at least one target radiation pattern coverage corresponding to at least one of the at least one physical antenna According to another aspect, a method for a receiving radio node is provided. The method includes receiving a signal from a transmitting radio node, the signal being based at least in part on a port-to-antenna mapping matrix, the port-to-antenna mapping matrix based at least in part on a source codebook and a target codebook, the source codebook associated with at least one antenna port and the target codebook associated with at least one physical antenna. In some embodiments of this aspect, the port-to-antenna mapping matrix is further based on a weight matrix, the weight matrix comprising, for each of one of a plurality of precoding vector pairs, one of a differentiated weight of sum square and an equal weight of sum square, each one of the plurality of precoding vector pairs comprising one precoding vector from the source codebook and one corresponding precoding vector from the target codebook. In some embodiments, the target codebook is based on at least one target radiation pattern coverage corresponding to at least one of the at least one physical antenna According to yet another aspect, a computer program, program product or computer readable storage medium is provided that includes instructions which when executed by at least one processor of a radio node perform any one of the methods described herein for a radio node.

According to yet another aspect, a computer program, program product or computer readable storage medium is provided that includes instructions which when executed by at least one processor of a receiving radio node perform any one of the methods described herein for a receiving radio node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flow chart illustrating example methods implemented in a communication system including a host computer, a radio node and a wireless device for executing a client application at a wireless device according to some embodiments of the present disclosure;

FIG. 8 is a flow chart illustrating example methods implemented in a communication system including a host computer, a radio node and a wireless device for receiving user data at a wireless device according to some embodiments of the present disclosure;

FIG. 9 is a flow chart illustrating example methods implemented in a communication system including a host computer, a radio node and a wireless device for receiving user data from the wireless device at a host computer according to some embodiments of the present disclosure;

FIG. 10 is a flow chart illustrating example methods implemented in a communication system including a host computer, a radio node and a wireless device for receiving user data at a host computer according to some embodiments of the present disclosure;

DETAILED DESCRIPTION

In virtualized AAS, the codebooks $X_h$ and $X_v$ are typically pre-defined or predetermined according to the configurations of the 2D CSI-RS ports ($N_1$, $N_2$) and the over-sampling rates $O_1$, $O_2$), which may be irrelevant to the port-to-antenna mapping. In other words, the port-to-antenna mapping is not typically adapted to a specific CSI-RS port virtualization, in which antenna ports are virtualized from a set of antenna elements with a mapping matrix $W_{p2a}$. In such virtualized AASs, one of the challenges at the network radio node side (e.g., eNB/gNB) is to design an optimum port-to-antenna mapping matrix $W_{p2a}$ with a given antenna layout and antenna port configurations to form a desired/target radiation pattern and coverage.

Generally, in each direction per polarization, there are N antenna elements that are to be virtualized to $N_1$ antenna ports with the over-sampling rate $O_1$. Traditionally, the port-to-antenna mapping is selected from one of the DFT vectors with which each port is mapped to partial antenna elements, denoted by $W_{p2a}=\text{kron}(I,q)$, where I is an identity matrix with a size of $N_1 \times N_1$; and q is a vector with a size of $$\frac{N}{N_1} \times 1$$

to form the coverage of the virtual sector. For example, it might be one of DFT vectors.

For example, in the horizontal orientation, there may be N=8 antenna elements per polarization, with antenna ports $N_1=4$ and over-sampling rate $O_1=4$. Two virtual sectors can be formed with two port-to-antenna mapping matrices $W_{p2a}^{(1)}$ and $W_{p2a}^{(2)}$. Each virtual sector may have $N_1=4$ antenna ports. The codebook used by the WD for the PMI report for each virtual sector may be the over-sampled DFT matrix with $N_1=4$, $O_1=4$. Accordingly, there may be a total of $N_1O_1=16$ precoding vectors in the codebook $X_h$. In this case, existing port-to-antenna mapping may be $W_{p2a}^{(1)}=\text{kron}(I_{4\times4},[1,j]^T)$ $W_{p2a}^{(2)}=\text{kron}(I_{4\times4},[1,-j]^T)$.

Figure 4:
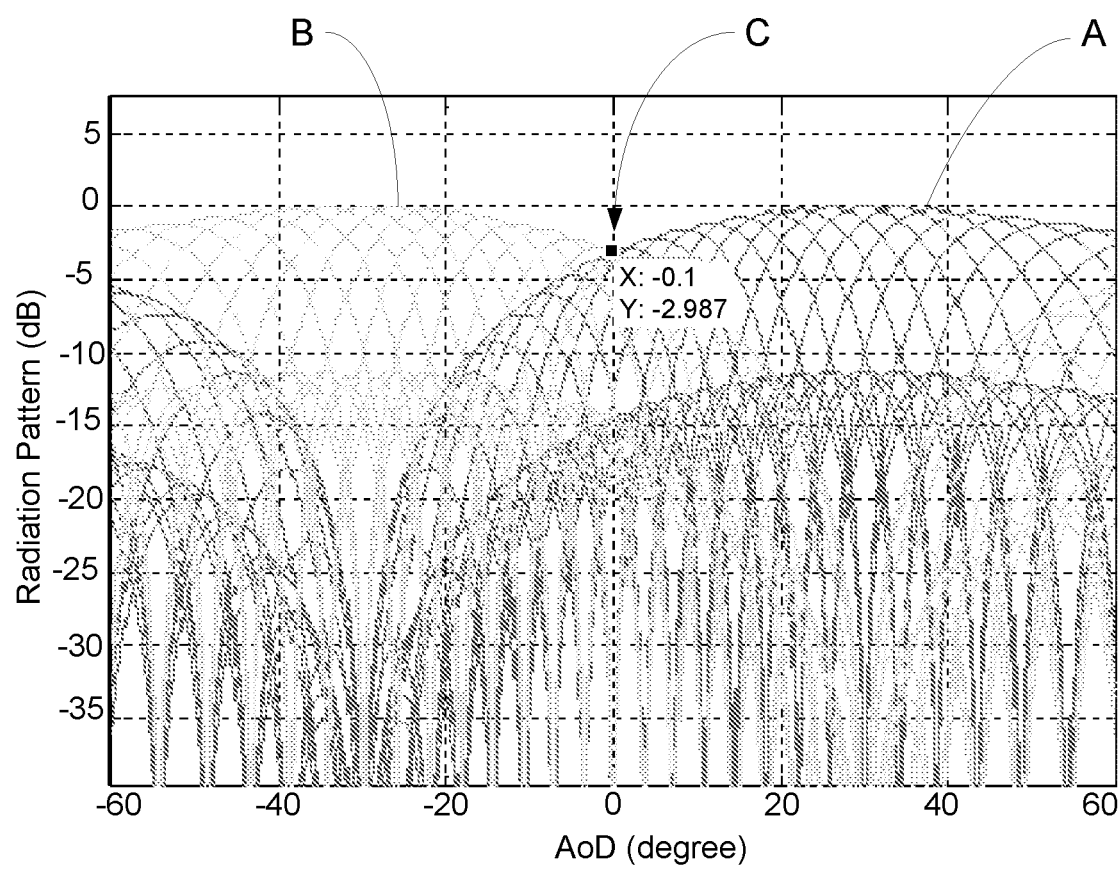
FIG. 4 illustrates an example beam radiation pattern with traditional port-to-antenna mapping.

However, a challenge with existing solutions is that the pre-defined/predetermined codebook and desired/target radiation pattern are not taken into consideration in the port-to-antenna mapping. As a result, the beam radiation pattern of DFT vector beams can be distorted by the port-to-antenna mapping, and not be matched well with expected results, as shown, for example, in FIG. 4. The curves with the darker lines (indicated by "A") are final beam patterns of precoding vectors in a first virtual sector. The curves with the lighter lines (indicated by "B") are final beam patterns of precoding vectors in a second virtual sector. FIG. 4 shows that there are coverage holes (indicated by "C") in the bore-sight and two sides of the cell with up to 3 dB power loss, and high sidelobe leakage, which can cause strong inter-sector interference.

Accordingly, some embodiments of the present disclosure provide a method and apparatus for port-to-antenna mapping design in a virtualized AAS, which may include one or more of the following:

Determining a source codebook (X) from a codebook pre-defined/predetermined according to the antenna ports.

Determining a target codebook (Y) in non-virtualized AAS. Each precoding vector in the target codebook is associated with one precoding vector in the source codebook, and has a desired/target radiation pattern and coverage.

Determining a weight of sum square for each precoding vector pair from the source codebook and the target codebook and forming a diagonal weight matrix (W).

Formulating the port-to-antenna mapping $W_{p2a}$ as a function of X, Y and W, expressed, for example, by $W_{p2a}=f(X,Y,W)$.

In some embodiments, the port-to-antenna mapping $W_{p2a}$ is formulized to weighted least square resolution, which may be expressed by $W_{p2a}=YWX^H(XWX^H)^{-1}$.

In some embodiments, the port-to-antenna mapping $W_{p2a}$ is formulized to least square resolution, which may be expressed by $W_{p2a}=YX^H(XX^H)^{-1}$.

In some embodiments, the port-to-antenna mapping $W_{p2a}$ is formulized to accurate linear equation resolution, which may be expressed by $W_{p2a}=YX^{-1}$ or $W_{p2a}=YX^H$.

In some embodiments, the port-to-antenna mapping may be optimized according to the codebook defined for the logical antenna ports and the target codebook in non-virtualized AAS. In addition, the radiation pattern of precoding vectors after port-to-antenna mapping may be close to the design target that can be achieved by non-virtualized AAS.

Some embodiments of the port-to-antenna mapping according to the principles of the present disclosure may be able to improve the virtualized cell or sector coverage and/or may be able to shape the beam radiation patterns more closely to the desired beam radiation patterns, as compared to existing port-to-antenna mapping techniques. For example, the principles of the present disclosure may help to reduce the sidelobe leakage that may result from existing port-to-antenna mapping techniques and form a coverage that is closer to the desired coverage.

Before describing in detail example embodiments, it is noted that the embodiments reside primarily in combinations of apparatus components and processing steps related to port-to-antenna mapping. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "radio node" used herein can be any kind of radio node comprised in a radio network which may further comprise any radio network node, such as, a base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The radio node may also comprise test equipment. The term "radio node" used herein may also be used to denote a wireless device (WD) such as a wireless device (WD) or a user equipment (UE).

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In some embodiments, the terms "logical antenna port," virtual antenna port" and "antenna port" are used interchangeably and are used to indicate a logical, i.e., non-physical, antenna port, as opposed to a physical antenna. In some embodiments, the logical antenna ports are logical or virtual entities, which may be distinguished by their reference signals, and/or formed by corresponding columns of a port-to-antenna mapping matrix.

In some embodiments, the terms "antenna element", "antenna subarray" and "physical antenna" are used interchangeably and may be used to indicate a physical antenna, as opposed to a non-physical logical or a virtual antenna port. In some embodiments, a virtualized AAS system in a radio node may include a number of physical antennas (e.g., 64) to which a number of virtual antenna ports (e.g., CSI-RS ports) are to be mapped (e.g., according to a port-to-antenna mapping matrix) for the transmission of signals to a receiving radio node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a radio node may be distributed over a plurality of wireless devices and/or radio nodes. In other words, it is contemplated that the functions of the radio node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
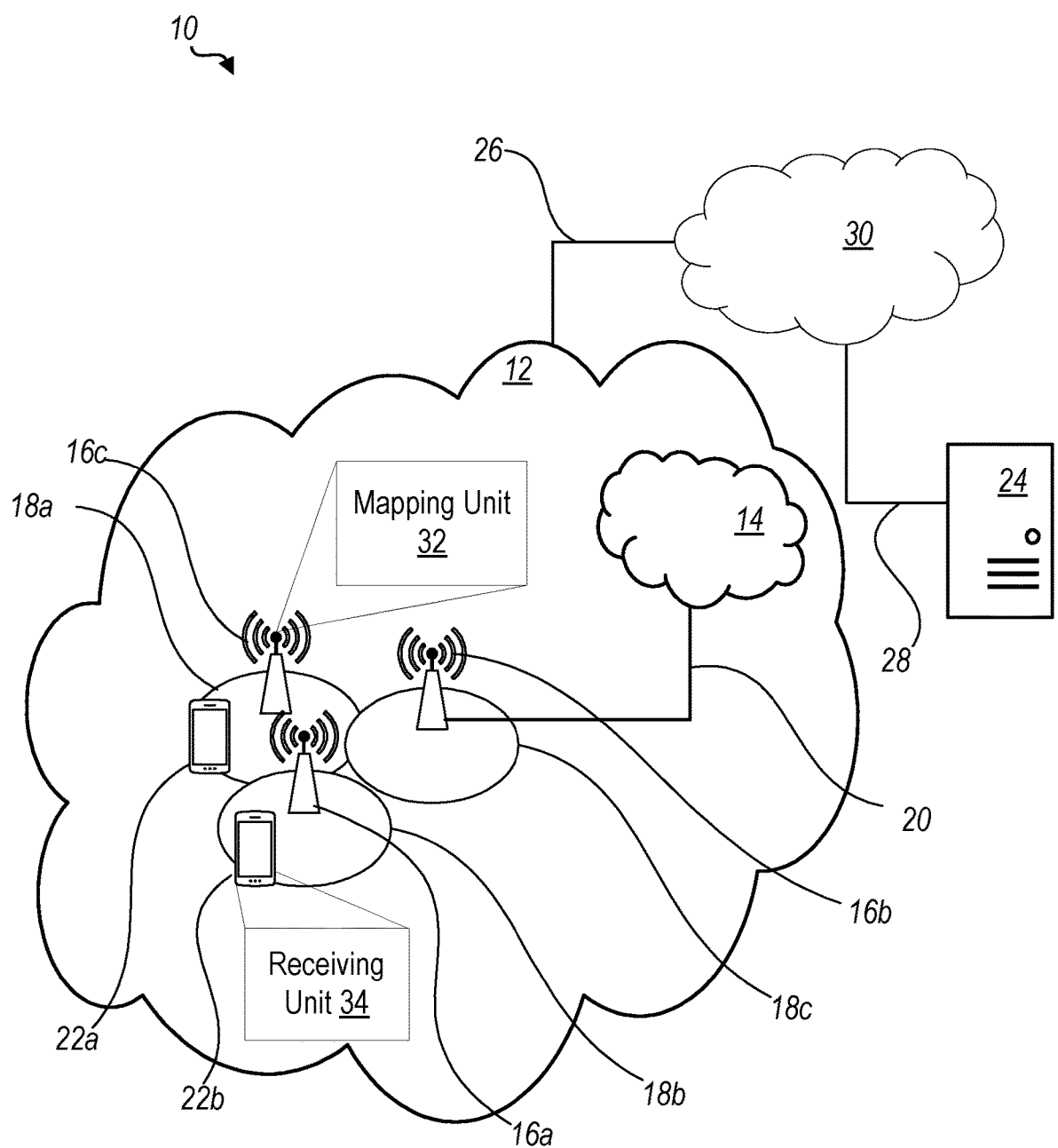
FIG. 5 is a schematic diagram of an example network architecture illustrating a communication system connected via an intermediate network to a host computer according to the principles in the present disclosure.

Returning to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of radio nodes 16a, 16b, 16c (referred to collectively as radio nodes 16), such as radio network nodes, NBs, eNBs, gNBs or other types of wireless access points, each defining a corresponding coverage area 18a, 18b, 18c (referred to collectively as coverage areas 18). Each radio node 16a, 16b, 16c is connectable to the core network 14 over a wired or wireless connection 20. A first wireless device (WD) 22a located in coverage area 18a is configured to wirelessly connect to, or be paged by, the corresponding radio node 16c. A second WD 22b in coverage area 18b is wirelessly connectable to the corresponding radio node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding radio node 16. Note that although only two WDs 22 and three radio nodes 16 are shown for convenience, the communication system 10 may include many more WDs 22 and radio nodes 16.

Further note that the WD 22 is also a radio node that may implement the techniques described in the disclosure for port-to-antenna mapping for e.g., Uplink (UL) communications, or even Sidelink (SL) communications. However, for purposes of distinguishing a radio node (e.g., radio node 16) that is, for example, a wireless access point serving the WD 22 from a radio node (e.g., WD) that is, for example, being served by a wireless access point, the terms WD 22 and radio node 16 are used in the description. Port-to-antenna mapping in the radio node 16 may be performed for e.g., downlink (DL) communications, or even SL communications.

Also, it is contemplated that a WD 22 can be in simultaneous communication and/or configured to separately communicate with more than one radio node 16 and more than one type of radio node 16. For example, a WD 22 can have dual connectivity with a radio node 16 that supports LTE and the same or a different radio node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a radio node 16 may not or need not be informed about the past routing of an incoming downlink communication with data originating from a host computer 24 to be forwarded (e.g., handed over) to a connected WD 22a. Similarly, the radio node 16 need not be aware of the future routing of an outgoing uplink communication originating from the WD 22a towards the host computer 24.

A radio node 16, or any transmitting radio node, is configured to include a mapping unit 32 which is configured to determine a source codebook associated with at least one antenna port; determine a target codebook associated with at least one physical antenna; and determine a port-to-antenna mapping matrix based at least in part on the determined source codebook and the determined target codebook.

A wireless device 22, or any receiving radio node, may be configured to include a receiving unit 34 which is configured to cause the receiving radio node to receive a signal from a transmitting radio node (e.g., radio node 16), the signal being based at least in part on a port-to-antenna mapping matrix, the port-to-antenna mapping matrix based at least in part on a source codebook and a target codebook, the source codebook associated with at least one antenna port and the target codebook associated with at least one physical antenna.

Figure 6:
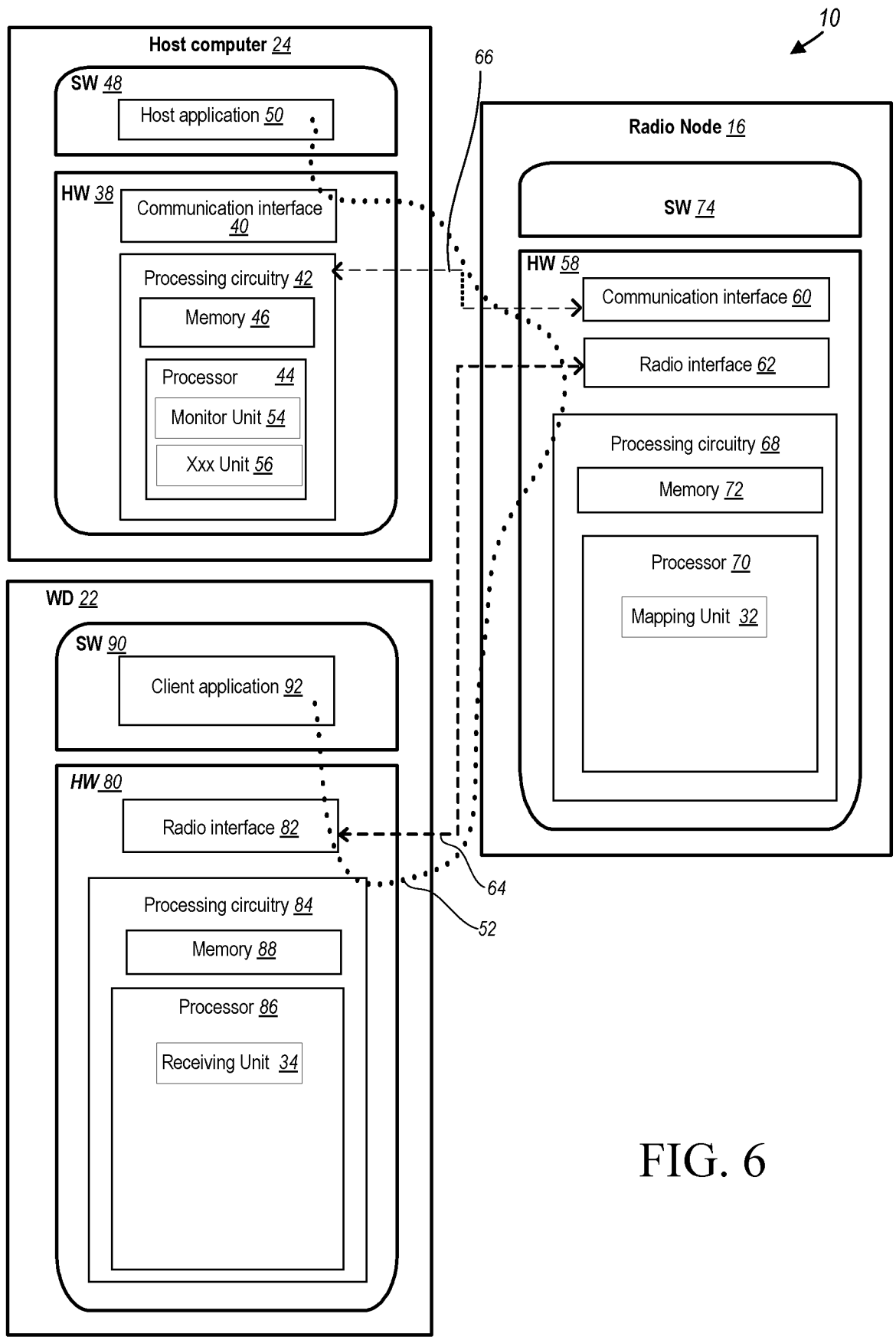
FIG. 6 is a block diagram of a host computer communicating via a radio node with a wireless device over an at least partially wireless connection according to some embodiments of the present disclosure.

It should be understood that although FIGS. 5 and 6 depict the mapping unit 32 in the radio node 16 and the receiving unit 34 in the WD 22 for simplicity, in some embodiments, the radio node 16 may also include the receiving unit 34 and, likewise, the WD 22 may also include the mapping unit 32, since the radio node 16 and the WD 22 may each be radio nodes capable of transmitting as well as receiving, according to the principles of the present disclosure.

Figure 1:
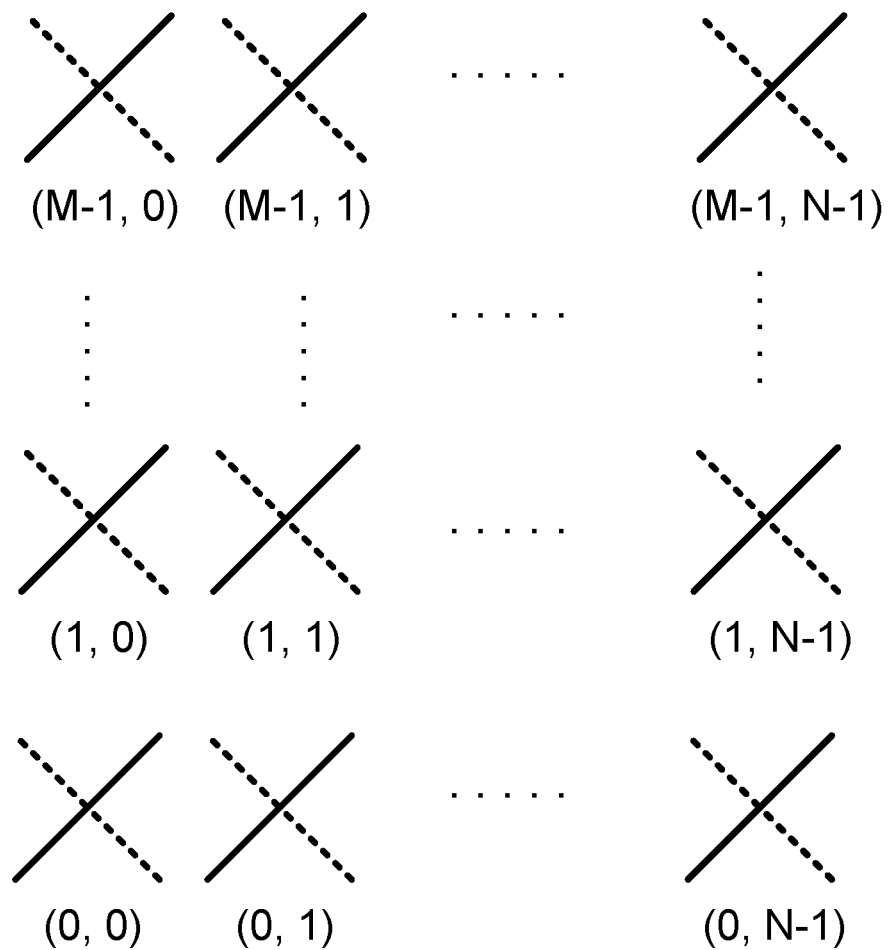
FIG. 1 is a schematic diagram illustrating an example of a two-dimensional antenna element array.
Figure 2:
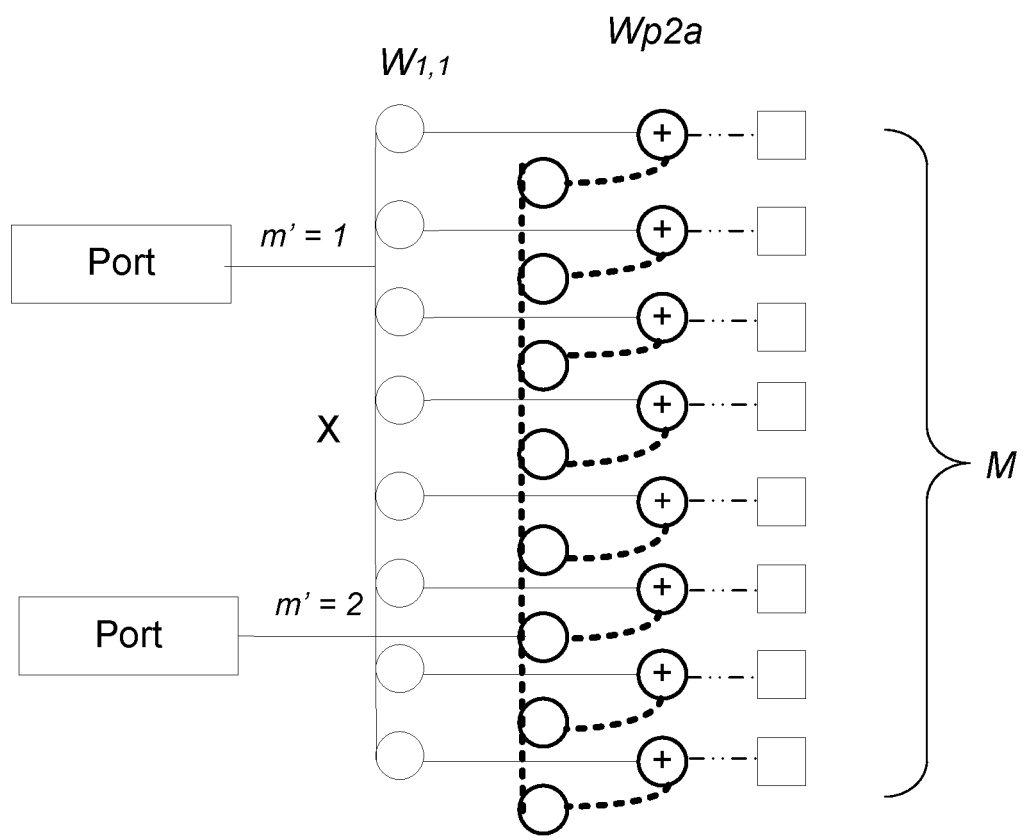
FIG. 2 is a schematic diagram illustrating an example of port-to-antenna mapping in virtualized AAS.
Figure 3:
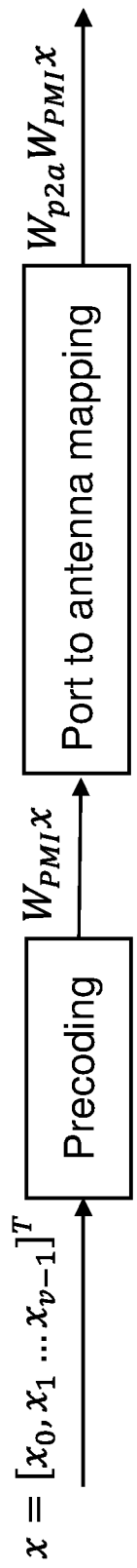
FIG. 3 is a block diagram of an example system model of Downlink (DL) precoding in a virtualized AAS.

Example implementations, in accordance with an embodiment, of the WD 22, radio node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the radio node 16 and/or the wireless device 22. The processing circuitry 42 of the host computer 24 may include a monitor unit 54 configured to enable the service provider to observe, monitor, control, transmit to and/or receive from the radio node 16 and/or the wireless device 22.

The communication system 10 further includes a radio node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the radio node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the radio node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the radio node 16 further has software 74 stored internally in, for example, memory 72, or stored in external memory (e.g., database, storage array, network storage device, etc.) accessible by the radio node 16 via an external connection. The software 74 may be executable by the processing circuitry 68. The processing circuitry 68 may be configured to control any of the methods and/or processes described herein and/or to cause such methods, and/or processes to be performed, e.g., by radio node 16. Processor 70 corresponds to one or more processors 70 for performing radio node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to radio node 16. For example, processing circuitry 68 of the radio node 16 may include the mapping unit 32 configured to determine a source codebook associated with at least one antenna port; determine a target codebook associated with at least one physical antenna; and determine a port-to-antenna mapping matrix based at least in part on the determined source codebook and the determined target codebook.

In some embodiments, the processing circuitry 68, such as via the mapping unit 32, is configured to determine the port-to-antenna mapping matrix by being further configured to generate a weight matrix based at least in part on the source codebook and the target codebook. In some embodiments, the processing circuitry 68 is configured to determine the port-to-antenna mapping matrix by being further configured to determine the port-to-antenna mapping matrix based at least in part on the generated weight matrix. In some embodiments, the processing circuitry 68 is configured to generate the weight matrix by being further configured to determine, for each one of a plurality of precoding vector pairs, a weight of the weight matrix, each one of the plurality of precoding vector pairs comprising one precoding vector from the source codebook and one corresponding precoding vector from the target codebook. In some embodiments, the processing circuitry 68 is configured to generate the weight matrix by being further configured to determine, for each one of a plurality of precoding vector pairs, one of a differentiated weight of sum square and an equal weight of sum square, each one of the plurality of precoding vector pairs comprising one precoding vector from the source codebook and one corresponding precoding vector from the target codebook.

In some embodiments, the processing circuitry 68, such as via the mapping unit 32, is configured to determine the port-to-antenna mapping matrix by being further configured to determine the port-to-antenna mapping matrix based at least in part on the determined weights for the weight matrix. In some embodiments, the processing circuitry 68 is configured to determine the port-to-antenna mapping matrix by being further configured to determine the port-to-antenna mapping matrix according to a function of at least the source codebook and the target codebook. In some embodiments, the processing circuitry 68 is configured to determine the port-to-antenna mapping matrix by being further configured to determine the port-to-antenna mapping matrix according to a weighted least square resolution, the weighted least square resolution using at least the source codebook, the target codebook, and the weight matrix. In some embodiments, the processing circuitry 68 is configured to determine the port-to-antenna mapping matrix by being further configured to determine the port-to-antenna mapping matrix according to a linear equation resolution, the linear equation resolution using at least the source codebook and the target codebook.

In some embodiments, the source codebook is selected from a predetermined codebook, the predetermined codebook being based on at least one channel state information reference signal, CSI-RS, port configuration. In some embodiments, the target codebook is different from the source codebook. In some embodiments, the target codebook is selected from a predetermined codebook based at least in part on at least one radiation pattern corresponding to at least one target coverage area. In some embodiments, the processing circuitry 68, such as via the mapping unit 32, is further configured to map the at least one antenna port to the at least one physical antenna according to the determined port-to-antenna mapping matrix. In some embodiments, the processing circuitry 68 is further configured to cause the radio node 16 to transmit data associated with the at least one antenna port via the at least one physical antenna according to the determined port-to-antenna mapping matrix. In some embodiments, wherein the radio node 16 is one of a network node and a wireless device 22. In some embodiments, the at least one physical antenna comprises at least one of at least one physical antenna element and at least one subarray forming at least a one-dimensional antenna array. In some embodiments, the processing circuitry 68 is configured to determine the source codebook associated with the at least one antenna port by being configured to select a plurality of precoding vectors in a codebook defined for the at least one antenna port. In some embodiments, the processing circuitry 68 is configured to determine the target codebook associated with the at least one physical antenna by being configured to, for each of the plurality of precoding vectors selected for the source codebook, determine a corresponding precoding vector for the target codebook based at least in part on at least one target radiation pattern corresponding to at least one target coverage area.

In some embodiments, a number of the selected plurality of precoding vectors at least meets a number of the at least one antenna ports. In some embodiments, the processing circuitry 68, such as via the mapping unit 32, is configured to determine the target codebook associated with the at least one physical antenna by being configured to select a plurality of precoding vectors from a plurality of Discrete Fourier Transform, DFT, vectors. In some embodiments, the processing circuitry 68 is configured to determine the target codebook associated with the at least one physical antenna by being configured to select a plurality of precoding vectors from a plurality of over-sampled Discrete Fourier Transform, DFT, vectors. In some embodiments, the processing circuitry 68 is configured to determine the target codebook associated with the at least one physical antenna by being configured to select a plurality of precoding vectors from one of a plurality of tapered Discrete Fourier Transform, DFT, vectors and a plurality of shifted DFT vectors. In some embodiments, the processing circuitry 68 is configured to determine the port-to-antenna mapping matrix by being configured to determine a three-dimensional port-to-antenna mapping matrix as a Kronecker product of three one-dimensional port-to-antenna mapping matrices, each of the three one-dimensional port-to-antenna mapping matrices based at least in part on a respective source codebook and a corresponding target codebook.

In some embodiments, the processing circuitry 68, such as via the mapping unit 32, is configured to determine the port-to-antenna mapping matrix by being configured to determine at least a two-dimensional port-to-antenna mapping matrix as a Kronecker product of at least two one-dimensional port-to-antenna mapping matrices, a first one of the one-dimensional port-to-antenna mapping matrices for a horizontal direction and a second one of the one-dimensional port-to-antenna mapping matrices for a vertical direction, each of the at least two one-dimensional port-to-antenna mapping matrices based at least in part on a respective source codebook and a corresponding target codebook in a corresponding direction.

The communication system 10 further includes the WD 22 already referred to. The WD 22 may have hardware 80 that may include a radio interface 82 configured to set up and maintain a wireless connection 64 with a radio node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a receiving unit 34 configured to cause the WD 22 to receive, such as via the radio interface 82, a signal from a transmitting radio node (e.g., radio node 16), the signal being based at least in part on a port-to-antenna mapping matrix, the port-to-antenna mapping matrix based at least in part on a source codebook and a target codebook, the source codebook associated with at least one antenna port and the target codebook associated with at least one physical antenna. In some embodiments, the port-to-antenna mapping matrix is further based on a weight matrix, the weight matrix comprising, for each of one of a plurality of precoding vector pairs, one of a differentiated weight of sum square and an equal weight of sum square, each one of the plurality of precoding vector pairs comprising one precoding vector from the source codebook and one corresponding precoding vector from the target codebook. In some embodiments, the target codebook is based on at least one target radiation pattern coverage corresponding to at least one of the at least one physical antenna In some embodiments, the inner workings of the radio node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the radio node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the radio node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the radio node 16, and it may be unknown or imperceptible to the radio node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the radio node 16 with a radio interface 62. In some embodiments, the radio node 16 is configured to, and/or the radio node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a radio node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the radio node 16, and/or preparing/terminating/maintaining/supporting/ending in receipt of a transmission from the radio node 16.

Although FIGS. 5 and 6 show various "units" such as mapping unit 32, and receiving unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry. Further, in some embodiments, both the mapping unit 32 and the receiving unit 34 may be within each respective processor of the radio node 16 and the WD 22.

FIG. 7 is a flowchart illustrating an example method implemented in a communication system, such as, for example, the communication system of FIGS. 5 and 6, in accordance with one embodiment. The communication system may include a host computer 24, a radio node 16 and a WD 22, which may be those described with reference to FIG. 6. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the radio node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 8 is a flowchart illustrating an example method implemented in a communication system, such as, for example, the communication system of FIG. 5, in accordance with one embodiment. The communication system may include a host computer 24, a radio node 16 and a WD 22, which may be those described with reference to FIGS. 5 and 6. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the radio node 16, in accordance with the teachings of the embodiments described throughout this disclosure. In an optional third step, the WD 22 receives the user data carried in the transmission (block S114).

FIG. 9 is a flowchart illustrating an example method implemented in a communication system, such as, for example, the communication system of FIG. 5, in accordance with one embodiment. The communication system may include a host computer 24, a radio node 16 and a WD 22, which may be those described with reference to FIGS. 5 and 6. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally, or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an example method implemented in a communication system, such as, for example, the communication system of FIG. 5, in accordance with one embodiment. The communication system may include a host computer 24, a radio node 16 and a WD 22, which may be those described with reference to FIGS. 5 and 6. In an optional first step of the method, in accordance with the teachings of the embodiments described throughout this disclosure, the radio node 16 receives user data from the WD 22 (block S128). In an optional second step, the radio node 16 initiates transmission of the received user data to the host computer 24 (block S130). In a third step, the host computer 24 receives the user data carried in the transmission initiated by the radio node 16 (block S132).

Figure 11:
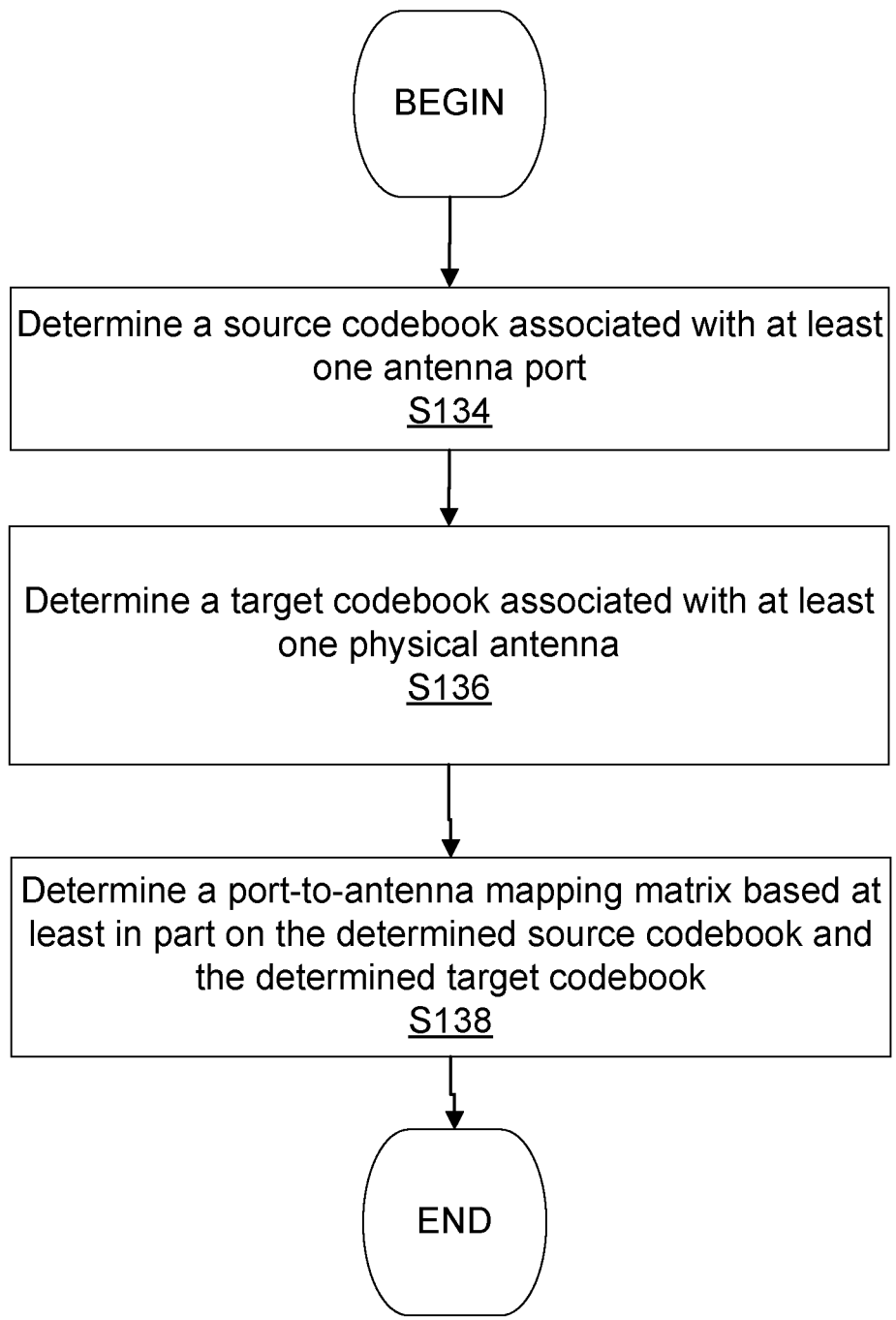
FIG. 11 is a flowchart of an example process in a radio node for port-to-antenna mapping according to some embodiments of the present disclosure.

FIG. 11 is a flowchart of an example process in a radio node 16 according to some embodiments of the present disclosure. The method includes determining a source codebook associated with at least one antenna port (block S134). The method includes determining a target codebook associated with at least one physical antenna (block S136). The method includes determining a port-to-antenna mapping matrix based at least in part on the determined source codebook and the determined target codebook (block S138).

In some embodiments, determining the port-to-antenna mapping matrix comprises generating a weight matrix based at least in part on the source codebook and the target codebook. In some embodiments, determining the port-to-antenna mapping matrix comprises determining the port-to-antenna mapping matrix based at least in part on the generated weight matrix. In some embodiments, generating the weight matrix comprises determining, for each one of a plurality of precoding vector pairs, a weight of the weight matrix, each one of the plurality of precoding vector pairs comprising one precoding vector from the source codebook and one corresponding precoding vector from the target codebook. In some embodiments, generating the weight matrix comprises determining, for each one of a plurality of precoding vector pairs, one of a differentiated weight of sum square and an equal weight of sum square, each one of the plurality of precoding vector pairs comprising one precoding vector from the source codebook and one corresponding precoding vector from the target codebook.

In some embodiments, determining the port-to-antenna mapping matrix comprises determining the port-to-antenna mapping matrix based at least in part on the determined weights for the weight matrix. In some embodiments, determining the port-to-antenna mapping matrix comprises determining the port-to-antenna mapping matrix according to a function of at least the source codebook and the target codebook. In some embodiments, determining the port-to-antenna mapping matrix comprises determining the port-to-antenna mapping matrix according to a weighted least square resolution, the weighted least square resolution using at least the source codebook, the target codebook, and the weight matrix. In some embodiments, determining the port-to-antenna mapping matrix comprises determining the port-to-antenna mapping matrix according to a linear equation resolution, the linear equation resolution using at least the source codebook and the target codebook. In some embodiments, the source codebook is selected from a predetermined codebook, the predetermined codebook being based on at least one channel state information reference signal, CSI-RS, port configuration.

In some embodiments, the target codebook is different from the source codebook. In some embodiments, the target codebook is selected from a predetermined codebook based at least in part on at least one radiation pattern corresponding to at least one target coverage area. In some embodiments, the method further includes mapping the at least one antenna port to the at least one physical antenna according to the determined port-to-antenna mapping matrix. In some embodiments, the method further includes causing the radio node (e.g., radio node 16) to transmit data associated with the at least one antenna port via the at least one physical antenna according to the determined port-to-antenna mapping matrix. In some embodiments, the radio node is one of a network node (e.g., radio node 16) and a wireless device 22. In some embodiments, the at least one physical antenna comprises at least one of at least one physical antenna element and at least one subarray forming at least a one-dimensional antenna array. In some embodiments, determining the source codebook associated with the at least one antenna port comprises selecting a plurality of precoding vectors in a codebook defined for the at least one antenna port. In some embodiments, the determining the target codebook associated with the at least one physical antenna comprises, for each of the plurality of precoding vectors selected for the source codebook, determining a corresponding precoding vector for the target codebook based at least in part on at least one target radiation pattern corresponding to at least one target coverage area.

In some embodiments, a number of the selected plurality of precoding vectors at least meets a number of the at least one antenna ports. In some embodiments, the determining the target codebook associated with the at least one physical antenna comprises selecting a plurality of precoding vectors from a plurality of Discrete Fourier Transform, DFT, vectors. In some embodiments, the determining the target codebook associated with the at least one physical antenna comprises selecting a plurality of precoding vectors from a plurality of over-sampled Discrete Fourier Transform, DFT, vectors. In some embodiments, the determining the target codebook associated with the at least one physical antenna comprises selecting a plurality of precoding vectors from one of a plurality of tapered Discrete Fourier Transform, DFT, vectors and a plurality of shifted DFT vectors. In some embodiments, determining the port-to-antenna mapping matrix comprises determining a three-dimensional port-to-antenna mapping matrix as a Kronecker product of three one-dimensional port-to-antenna mapping matrices, each of the three one-dimensional port-to-antenna mapping matrices based at least in part on a respective source codebook and a corresponding target codebook.

In some embodiments, determining the port-to-antenna mapping matrix comprises determining at least a two-dimensional port-to-antenna mapping matrix as a Kronecker product of at least two one-dimensional port-to-antenna mapping matrices, a first one of the one-dimensional port-to-antenna mapping matrices for a horizontal direction and a second one of the one-dimensional port-to-antenna mapping matrices for a vertical direction, each of the at least two one-dimensional port-to-antenna mapping matrices based at least in part on a respective source codebook and a corresponding target codebook in a corresponding direction.

Figure 12:
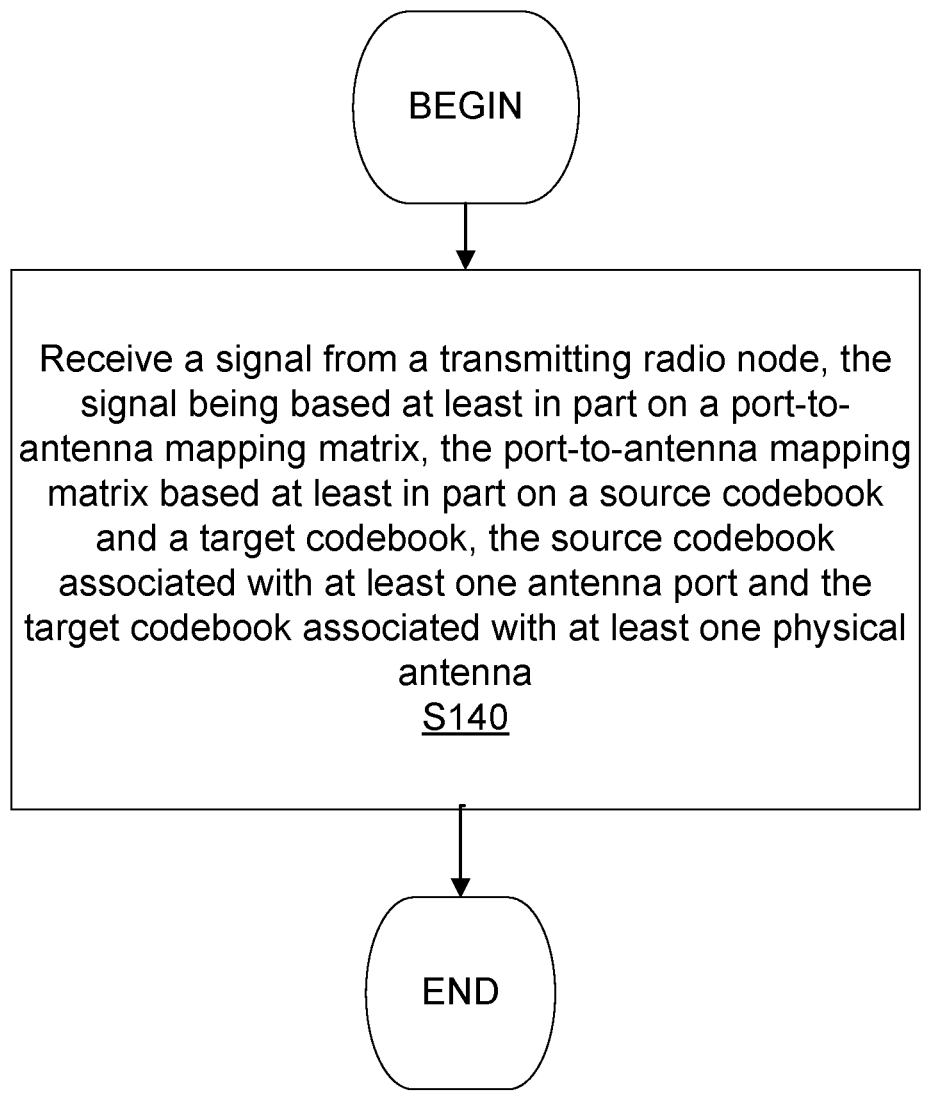
FIG. 12 is a flowchart of an example process in a receiving radio node for receiving a signal processed via a port-to-antenna mapping according to some embodiments of the present disclosure.

FIG. 12 is a flowchart of an example process in a wireless device 22 according to some embodiments of the present disclosure. The process includes receiving a signal from a transmitting radio node, the signal being based at least in part on a port-to-antenna mapping matrix, the port-to-antenna mapping matrix based at least in part on a source codebook and a target codebook, the source codebook associated with at least one antenna port and the target codebook associated with at least one physical antenna (block S140). In some embodiments, the port-to-antenna mapping matrix is further based on a weight matrix, the weight matrix comprising, for each of one of a plurality of precoding vector pairs, one of a differentiated weight of sum square and an equal weight of sum square, each one of the plurality of precoding vector pairs comprising one precoding vector from the source codebook and one corresponding precoding vector from the target codebook. In some embodiments, the target codebook based on at least one target radiation pattern coverage corresponding to at least one of the at least one physical antenna Having described some embodiments for port-to-antenna mapping according to the principles of the present disclosure, a more detailed description of at least some of the embodiments is described below.

Port-to-Antenna Mapping

In this section, an optimization method of port-to-antenna mapping according to at least some of the principles of the disclosure is described in one dimension (1D) for clarity, which may be either a horizontal or a vertical direction, per polarization. It is understood that the principles provided herein may be applied to multiple dimensions.

Initially, a source codebook X may be determined by e.g., a mapping unit 32 of a radio node 16, which may be a transmitting radio node (e.g., radio node 16 or, in some embodiments, a WD such as WD 22) by selecting partial or full precoding vectors in the codebook defined for the antenna ports (e.g., $X_h$ or $X_p$ described above). Subsequently, for each precoding vector $x_k$ in the source codebook, a corresponding precoding vector y may be determined by e.g. radio node 16 for non-virtualized AAS as a design target with a desired/target radiation pattern and coverage, to form a target codebook Y.

A mapping matrix $W_{p2a}$ may be determined by e.g., the mapping unit 32 of the radio node 16. In some embodiments, the mapping matrix $W_{p2a}$ may be configured to allow every source codebook precoding vector $x_k$, after the port-to-antenna mapping, to be equal to the corresponding target codebook precoding vector $y_k$, which may be expressed by $$W_{p2a}x_k=y_k, x_k \in X, y_k \in Y.$$

It can be expressed in a matrix as follows, $$W_{p2a}X=Y.$$

In some embodiments, because X may not be invertible, the port-to-antenna mapping can be formulated to be a weighted linear least squares (LS) problem. Thus, a weighted LS resolution can be obtained, for example, by $$W_{p2a}YWX^H(XWX^H)^{-1},$$

where weight matrix $W=\text{diag}(w_0, \ldots, w_k, \ldots w_{K-})$, where $w_k$ is the weight of sum square S contributed from the k-th precoding vector, expressed, for example, by $$S=\sum_{k=0}^{K-1} w_k |W_{p2a}x_k - y_k|^2.$$

If W=I, the problem may be simplified to an LS approximation, expressed, for example, by $$W_{p2a}YX^H(XX^H)^{-1}.$$

If X is invertible and W=I, the problem may be simplified to $W_{p2a}=YX^H$.

If $XX^H=I$ and W=I, the problem may be further simplified to $W_{p2a}=YX^H$.

In these latter two cases, $W_{p2a}$ may be an accurate resolution of $W_{p2a}X=Y$.

Source Codebook Selection

In some embodiments, the source codebook X for port-to-antenna mapping may be determined or selected by e.g., the mapping unit 32 of the radio node 16 from, per dimension, the codebook (e.g., $X_h$) pre-defined/predetermined according to the antenna port configurations. The full or partial precoding vectors can be selected from the pre-defined codebook. For example, the source codebook may include precoding vectors from the codebook that is pre-defined according to the antenna ports, which may be expressed, for example, by $$X=[x_0, \ldots, x_k, \ldots, x_{K-1}], k \in \{0, 1, \ldots, N_1 O_1 - 1\},$$

where $x_k$ is selected from an over-sampled DFT codebook-based number of ports $N_1$ and the over-sampling rate $O_1$, denoted, for example, by $$x_k = \frac{1}{\sqrt{N_1}} \left[ 1, e^{\frac{j2\pi k}{N_1 O_1}}, \ldots, e^{\frac{j2\pi nk}{N_1 O_1}}, \ldots, e^{\frac{j2\pi(N_1-1)k}{N_1 O_1}} \right]^T.$$

In some embodiments, the number of selected precoding vectors (K) should not be less than the number of antenna ports, that is $K \geq N_1$. If the codebook (e.g. $X_h$) is not oversampled (e.g., $O_1=1$), the full codebook should be selected by e.g., radio node 16. If the codebook (e.g. $X_h$) is oversampled, a partial codebook can be selected. Several examples for selecting precoding vectors (e.g., from a codebook, a codebook pre-defined according to the antenna ports) to be included in the source codebook are given below:

Select the non-oversampled orthogonal DFT vectors (e. g., k=0,$0_1$, $20_1$, . . . ).

Select the oversampled DFT vectors (e. g., k=1,$0_1$+1,$20_1$+1, . . . ).

Select the first K precoding vectors (e. g., k=0, 1, . . . , K−1).

Target Codebook Determination

In some embodiments, for each precoding vector in the source codebook X, the corresponding precoding vector in target codebook Y may be determined (e. g., by radio node such as via the mapping unit 32 of the radio node 16, or the WD 22) to e.g., have a desired/target radiation pattern coverage. For example, there may be N antenna elements and $N_1$ antenna ports with antenna elements $N=2N_1$ and oversampling rate $0_1$, with which two virtual sectors can be formed. If, for example, the full codebook is selected for the source codebook X, the first half of the over-sampled DFT vectors can be selected as a desired target with a desired/target radiation pattern and coverage for the first virtual sector, expressed, for example, by $$Y=[y^0, \ldots, y_k, \ldots, y_{N_1 O_1}-1],$$

where $$y_k = \frac{1}{\sqrt{N}} \left[ 1, e^{\frac{j2\pi k}{NO_1}}, \ldots, e^{\frac{j2\pi nk}{NO_1}}, \ldots, e^{\frac{j2\pi(N-1)k}{NO_1}} \right]^T.$$

The second half of over-sampled DFT vectors may be selected for a design target radiation for the second virtual sector, expressed, for example, by $$Y=[y_{N_1 O_1}, \ldots, y_k, \ldots, y_{NO_1}-1].$$

The target codebook can also be selected from tapered DFT vectors, denoted, for example, by $$y_k = \frac{1}{\sqrt{N}} \left[ \alpha_0, \alpha_1 e^{\frac{j2\pi k}{NO_1}}, \ldots, \alpha_n e^{\frac{j2\pi nk}{NO_1}}, \ldots, \alpha_{N-1} e^{\frac{j2\pi(N-1)k}{NO_1}} \right]^T,$$

where $\alpha_n$ is the tapper window coefficient applied to the n-th antenna. In other embodiments, there may be other techniques for determining the target codebook.

Weight Matrix Determination

In some embodiments, for each selected precoding vector pair (e. g., $x_k$, $y_k$), a least square weight $w_k$ is determined, such as via the mapping unit 32 of the radio node 16, based on the contribution of sum square from the selected precoding vector pair. For example, if $w_k=1$ for all selected precoding vector pairs, all selected precoding pairs have equal contribution to the sum square. In this case, weight matrix W=I. By setting different weights for each precoding vector, the radiation pattern target in desired/targeted directions may be achieved. For example, a higher weight can be set to the precoding vectors in directions of hot-spots; and a smaller weight can be set to the precoding vectors in directions of low traffic areas.

Three-Dimension (3D) Port-to-Antenna Mapping Construction

In some embodiments, the port-to-antenna mapping for both horizontal and vertical directions, and the two polarizations (3D port-to-antenna mapping) may be constructed (e.g., by the radio node such as the radio node 16 or WD 22) with, for example, the Kronecker product of the three one-dimensional port-to-antenna mapping matrices designed in each dimension as follows, $$W_{p2a} = W_{p2a}^{(p)} \otimes W_{p2a}^{(h)} \otimes W_{p2a}^{(v)}.$$

In some embodiments, $$W_{p2a}^{(p)} = \begin{bmatrix} 1 & 0 \\ 0 & 1 \end{bmatrix}$$

is used by assuming that the antenna ports of each polarization are mapped to physical antenna elements of the corresponding polarization with the same port-to-antenna mapping matrix.

The matrices $W_{p2a}^{(h)}$ and $W_{p2a}^{(v)}$ are port-to-antenna mapping matrices designed for horizontal and vertical directions, respectively according to at least some of the principles of the present disclosure.

Beam Radiation Pattern with the New Mapping Matrix $W_{p2a}$

In some embodiments, the beam radiation pattern resulting from the mapping matrix of the present disclosure may provide improved coverage. In an example, in horizontal, there is N=8 physical antenna per polarization, and $N_1$=4 antenna ports and oversampling rate $0_1$=4. Two virtual sectors can be formed with two port-to-antenna mapping matrices $W_{p2a}^{(1)}$ and $W_{p2a}^{(2)}$. Each virtual sector may have $N_1$=4 antenna ports. The pre-defined codebook (e.g., $X_h$) for each virtual sector may be an over-sampled DFT matrix with $N_1$=4, $0_1$=4. Thus, there may be a total of $N_1 0_1$=16 precoding vectors. The beam radiation pattern with the mapping matrix $W_{p2a}$ according to an example of the principles of the present disclosure are shown in FIG. 13 and FIG. 14, as examples.

Figure 13:
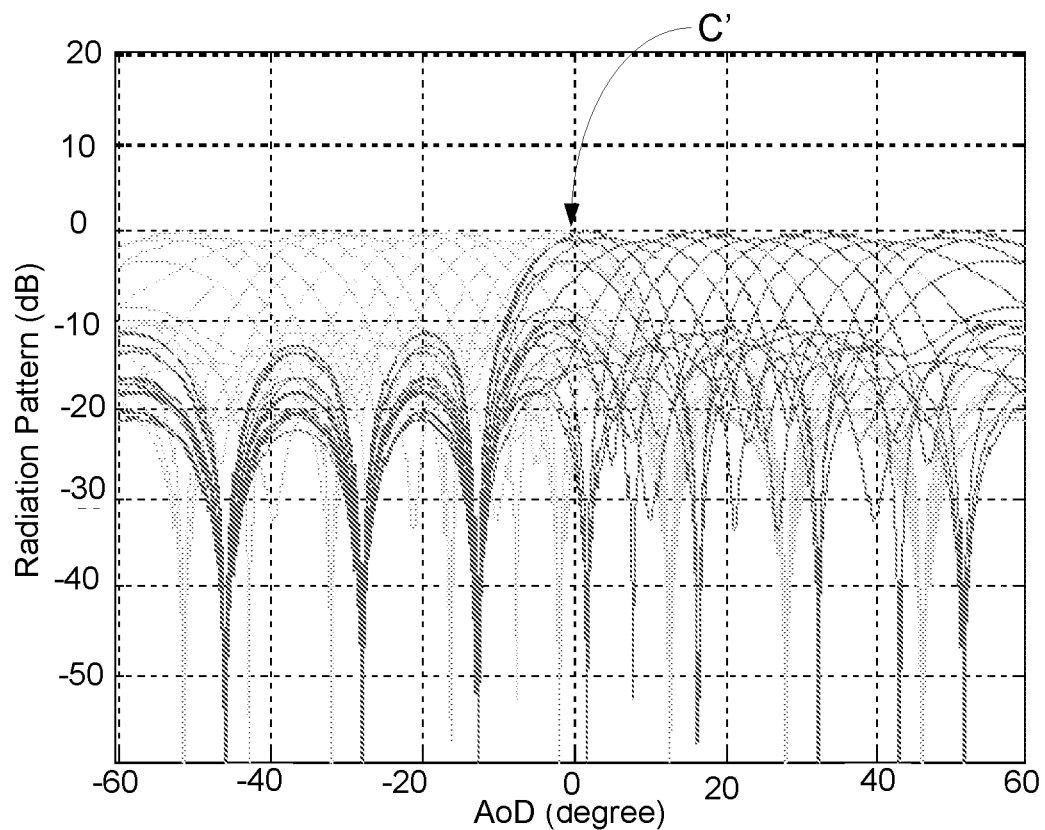
FIG. 13 illustrates an example beam radiation pattern with port-to-antenna mapping and discrete Fourier transform (DFT) as a design target according to the principles of the present disclosure.
Figure 14:
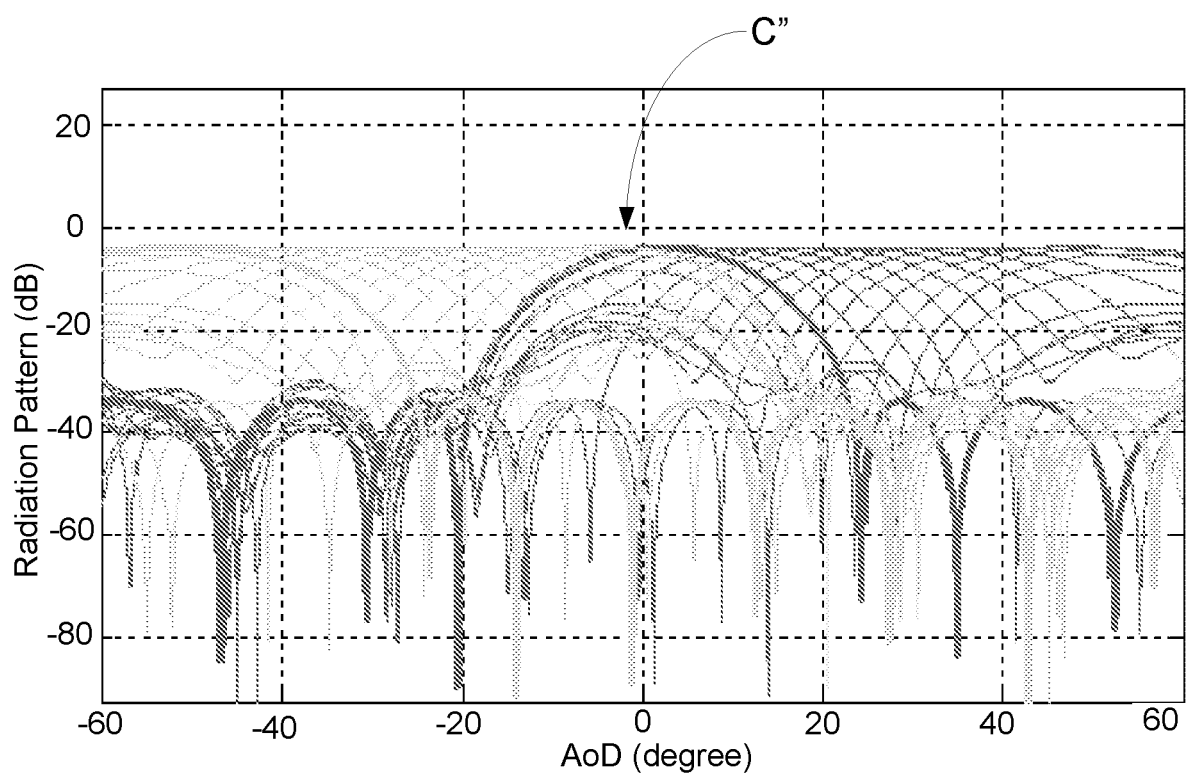
FIG. 14. Illustrates an example beam radiation pattern with port-to-antenna mapping and tapered DFT as a design target according to the principles of the present disclosure.

In FIG. 13, the source codebook X is selected from the over-sampled DFT codebook with $N_1$=4, $0_1$=4, denoted by $$X=[x_0, x_4, x_8, x_{12}].$$

The target codebook Y is selected from a shifted over-sampled DFT codebook with N=8, $0_1$=4. In the example, the target codebook for first virtual sector may be $$Y=[y_{16}, y_{20}, y_{24}, y_{28}].$$

The target codebook for the second virtual sector may be $$Y=[y_3, y_7, y_{11}, y_{15}],$$

where $$y_k = \frac{1}{\sqrt{N}} \left[ 1, e^{\frac{j2\pi(k-NO_1+1)}{NO_1}}, \ldots, e^{\frac{j2\pi n(k-NO_1+1)}{NO_1}}, \ldots, e^{\frac{j2\pi(N-1)(k-NO_1+1)}{NO_1}} \right]^T.$$

FIG. 13 shows that the coverage hole of traditional port-to-antenna mapping (e.g., as shown by C in FIG. 4) is no longer present. In other words, the beam patterns resulting from the port-to-antenna mapping of the present disclosure are improved (e.g., in the area as an indicated by C' in FIG. 13) over existing port-to-antenna mapping techniques. In FIG. 14, the target codebook is selected from a tapered and shifted DFT matrix, which may be expressed, for example, by $$y_k = \frac{1}{\sqrt{N}} \left[ \alpha_0, \alpha_1 e^{\frac{j2\pi(k-NO_1+1)}{NO_1}}, \ldots, \alpha_n e^{\frac{j2\pi n(k-NO_1+1)}{NO_1}}, \ldots, \alpha_{N-1} e^{\frac{j2\pi(N-1)(k-NO_1+1)}{NO_1}} \right]^T.$$

As can be seen in FIG. 14, the beam patterns resulting from the port-to-antenna mapping of the present disclosure with a tapered DFT matrix is also shown as improved over existing port-to-antenna mapping techniques (e.g., in the area as indicated by C'' in FIG. 14).

In some embodiments, improved coverage may be achieved by designing a port-to-antenna mapping with reduced sidelobe leakage, by which the Multi-User MIMO (MU-MIMO) can be achieved in two sectors.

Some embodiments of the present disclosure provide for a port-to-antenna mapping that can be optimized according to the antenna layout and/or the codebook pre-defined/predetermined for the antenna ports and/or for a desired radiation pattern and coverage.

It should be understood that even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the radio node 16 is the transmitter and the receiver is the WD 22. For the UL communication, the transmitter is the WD 22 and the receiver is the radio node 16.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g.

representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Any two or more embodiments described in this disclosure may be combined in any way with each other. As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| AAS | Active Antenna System |
| BBU | Baseband Unit |
| CSI-RS | Channel State Information Reference Signal |
| DFT | Discrete Fourier Transform |
| DMRS | Demodulation Reference Signal |
| FD-MIMO | Full Dimension MIMO |
| GoB | Grid-of-beams |
| PMI | Precoding Matrix Indicator |
| RRH | Remote Radio Head. |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:
1. A radio node comprising processing circuitry, the processing circuitry configured to:
  determine a source codebook associated with at least one antenna port;

determine a target codebook associated with at least one physical antenna, the target codebook being based on at least one radiation pattern corresponding to at least one of the at least one physical antenna; and determine a port-to-antenna mapping matrix based at least in part on the determined source codebook and the determined target codebook.

2. The radio node of claim 1, wherein the processing circuitry is configured to determine the port-to-antenna mapping matrix by:

generating a weight matrix based at least in part on the source codebook and the target codebook; and determining the port-to-antenna mapping matrix based at least in part on the generated weight matrix.

3. The radio node of claim 2, wherein the processing circuitry is configured to generate the weight matrix by at least one of:

determining, for each one of a plurality of precoding vector pairs, a weight of the weight matrix, each one of the plurality of precoding vector pairs comprising one precoding vector from the source codebook and one corresponding precoding vector from the target codebook; and determining, for each one of a plurality of precoding vector pairs, one of a differentiated weight of sum square and an equal weight of sum square, each one of the plurality of precoding vector pairs comprising one precoding vector from the source codebook and one corresponding precoding vector from the target codebook.

4. The radio node of claim 1, wherein the processing circuitry is configured to determine the port-to-antenna mapping according to at least one of:

to a weighted least square resolution, the weighted least square resolution using at least the source codebook, the target codebook, and the weight matrix; and a linear equation resolution, the linear equation resolution using at least the source codebook and the target codebook.

5. The radio node of claim 1, wherein the source codebook is selected from a predetermined codebook, the predetermined codebook being based on at least one channel state information reference signal, CSI-RS, port configuration.

6. The radio node of claim 1, wherein the target codebook is selected from a predetermined codebook based at least in part on at least one radiation pattern corresponding to at least one target coverage area.

7. The radio node of claim 1, wherein the processing circuitry is further configured to:

map the at least one antenna port to the at least one physical antenna according to the determined port-to-antenna mapping matrix.

8. The radio node of claim 1, wherein the processing circuitry is further configured to:

cause the radio node to transmit data associated with the at least one antenna port via the at least one physical antenna according to the determined port-to-antenna mapping matrix.

9. The radio node of claim 1, wherein the processing circuitry is configured to determine the source codebook associated with the at least one antenna port by:

selecting a plurality of precoding vectors in a codebook defined for the at least one antenna port.

10. The radio node of claim 9, wherein the processing circuitry is configured to determine the target codebook associated with the at least one physical antenna by:

for each of the plurality of precoding vectors selected for the source codebook, determine a corresponding precoding vector for the target codebook based at least in part on at least one target radiation pattern corresponding to at least one target coverage area.

11. The radio node of claim 9, wherein the processing circuitry is configured to select the plurality of precoding vectors from any one or more of:

a plurality of Discrete Fourier Transform, DFT, vectors;

a plurality of over-sampled Discrete Fourier Transform, DFT, vectors; and one of a plurality of tapered discrete Fourier transform, DFT, vectors and a plurality of shifted DFT vectors.

12. The radio node of claim 1, wherein the processing circuitry is configured to determine the port-to-antenna mapping matrix by at least one of:

determining a three-dimensional port-to-antenna mapping matrix as a Kronecker product of three one-dimensional port-to-antenna mapping matrices, each of the three one-dimensional port-to-antenna mapping matrices based at least in part on a respective source codebook and a corresponding target codebook and determining at least a two-dimensional port-to-antenna mapping matrix as a Kronecker product of at least two one-dimensional port-to-antenna mapping matrices, a first one of the one-dimensional port-to-antenna mapping matrices for a horizontal direction and a second one of the one-dimensional port-to-antenna mapping matrices for a vertical direction, each of the at least two one-dimensional port-to-antenna mapping matrices based at least in part on a respective source codebook and a corresponding target codebook in a corresponding direction.

13. A method for a radio node, the method comprising:

determining a source codebook associated with at least one antenna port;

determining a target codebook associated with at least one physical antenna, the target codebook being based on at least one radiation pattern corresponding to at least one of the at least one physical antenna; and determining a port-to-antenna mapping matrix based at least in part on the determined source codebook and the determined target codebook.

14. The method of claim 13, wherein determining the port-to-antenna mapping matrix comprises:

generating a weight matrix based at least in part on the source codebook and the target codebook; and determining the port-to-antenna mapping matrix based at least in part on the generated weight matrix.

15. The method of claim 14, wherein generating the weight matrix comprises at least one of:

determining, for each one of a plurality of precoding vector pairs, a weight of the weight matrix, each one of the plurality of precoding vector pairs comprising one precoding vector from the source codebook and one corresponding precoding vector from the target codebook; and determining, for each one of a plurality of precoding vector pairs, one of a differentiated weight of sum square and an equal weight of sum square, each one of the plurality of precoding vector pairs comprising one precoding vector from the source codebook and one corresponding precoding vector from the target codebook.

16. The method of claim 14, wherein determining the port-to-antenna mapping matrix comprises at least one of:
   determining the port-to-antenna mapping matrix according to a weighted least square resolution, the weighted least square resolution using at least the source codebook, the target codebook, and the weight matrix; and
   determining the port-to-antenna mapping matrix according to a linear equation resolution, the linear equation resolution using at least the source codebook and the target codebook.

17. The method of claim 13, wherein the source codebook is selected from a predetermined codebook, the predetermined codebook being based on at least one channel state information reference signal, CSI-RS, port configuration.

18. The method of claim 13, wherein the target codebook is different from the source codebook.

19. The method of claim 13, wherein the target codebook is selected from a predetermined codebook based at least in part on at least one radiation pattern corresponding to at least one target coverage area.

20. The method of claim 13, further comprising:
   mapping the at least one antenna port to the at least one physical antenna according to the determined port-to-antenna mapping matrix.

21. The method of claim 13, further comprising:
   causing the radio node to transmit data associated with the at least one antenna port via the at least one physical antenna according to the determined port-to-antenna mapping matrix.

22. The method of claim 13, wherein the at least one physical antenna comprises at least one of at least one physical antenna element and at least one subarray forming at least a one-dimensional antenna array.

23. The method of claim 13, wherein determining the source codebook associated with the at least one antenna port comprises:
   selecting a plurality of precoding vectors in a codebook defined for the at least one antenna port.

24. The method of claim 23, wherein the determining the target codebook associated with the at least one physical antenna comprises:
   for each of the plurality of precoding vectors selected for the source codebook, determining a corresponding precoding vector for the target codebook based at least in part on at least one target radiation pattern corresponding to at least one target coverage area.

25. The method of claim 23, wherein a number of the selected plurality of precoding vectors at least meets a number of the at least one antenna port.

26. The method of claim 23, wherein determining the target codebook associated with the at least one physical antenna comprises any one or more of:
   selecting a plurality of precoding vectors from a plurality of Discrete Fourier Transform, DFT, vectors;
   selecting a plurality of precoding vectors from a plurality of over-sampled discrete Fourier transform, DFT, vectors; and
   selecting a plurality of precoding vectors from one of a plurality of tapered Discrete Fourier Transform, DFT, vectors and a plurality of shifted DFT vectors.

27. The method of claim 13, wherein determining the port-to-antenna mapping matrix comprises at least one of:
   determining a three-dimensional port-to-antenna mapping as a Kronecker product of three one-dimensional port-to-antenna mapping matrices, each of the three one-dimensional port-to-antenna mapping matrices based at least in part on a respective source codebook and a corresponding target codebook; and
   determining at least a two-dimensional port-to-antenna mapping matrix as a Kronecker product of at least two one-dimensional port-to-antenna mapping matrices, a first one of the one-dimensional port-to-antenna mapping matrices for a horizontal direction and a second one of the one-dimensional port-to-antenna mapping matrices for a vertical direction, each of the at least two one-dimensional port-to-antenna mapping matrices based at least in part on a respective source codebook and a corresponding target codebook in a corresponding direction.

* * * * *